United States Patent [19]

DeWit

[11] Patent Number: 4,797,292
[45] Date of Patent: Jan. 10, 1989

[54] PROCESS FOR PREPARING AGGLOMERATES OF POTATO GRANULES

[75] Inventor: Johannes DeWit, Beauvais, France

[73] Assignee: Nestec S. A., Vevey, Switzerland

[21] Appl. No.: 88,947

[22] Filed: Aug. 24, 1987

[30] Foreign Application Priority Data

Sep. 26, 1986 [FR] France .................................. 8613473

[51] Int. Cl.$^4$ ............................................. A23L 1/2165
[52] U.S. Cl. .................................... 426/285; 426/453; 426/637
[58] Field of Search ............... 426/285, 453, 456, 464, 426/637

[56] References Cited

U.S. PATENT DOCUMENTS

| 3,056,683 | 10/1962 | Cyr ........................................ 426/637 |
| 3,457,088 | 7/1969 | Beck . |
| 3,458,325 | 7/1969 | Beck . |
| 3,493,390 | 2/1970 | Succo .............................. 426/637 X |
| 3,565,636 | 2/1971 | Hutchings et al. ............. 426/637 X |
| 3,809,758 | 5/1974 | Mathias et al. ...................... 426/285 |
| 3,830,943 | 8/1974 | Hix et al. . |
| 4,156,032 | 5/1979 | Kluge et al. ..................... 426/464 X |
| 4,517,211 | 5/1988 | Haraldsson et al. ............ 426/637 X |

FOREIGN PATENT DOCUMENTS

| 0133657 | 11/1978 | Japan .................................. 426/637 |
| 1274864 | 5/1972 | United Kingdom ................ 426/285 |

Primary Examiner—Arthur L. Corbin
Attorney, Agent, or Firm—Vogt & O'Donnell

[57] ABSTRACT

Agglomerated potato granules are prepared from a mixture of potato granules, egg white solids and water. The egg white solids, in a quantity of from 2 to 3 parts by weight, are mixed with the potato granules and water which are each in a quantity of from 45 to 55 parts by weight. The mixture is passed through a 3 mm to 6 mm mesh sieve, and then the sieved moist powder is dried for obtaining a dried agglomerated powder. The agglomerated powder then is crushed to form agglomerates having apparent densities in the range of from 0.2 g/cm$^3$ to 0.45 g/cm$^3$.

7 Claims, No Drawings

PROCESS FOR PREPARING AGGLOMERATES OF POTATO GRANULES

BACKGROUND OF THE INVENTION

This invention relates to a process for the agglomeration of potato granules and to the agglomerates obtained by this process.

Traditional instant dehydrated potato purees are generally produced either in the form of flakes or in the form of granules. The traditional flakes obtained by roller drying of a cooked potato puree have an apparent density of approximately 0.25-0.30 g/cm$^3$ and may be reconstituted, i.e., rehydrated with hot or cold water but not with boiling water. The traditional granules obtained by a process in which cut cooked potatoes are disintegrated and partially dried by mixing with recycled dried granules, then finally dried with moderately hot air have an apparent density of approximately 0.9 g/cm$^3$ and may be reconstituted with boiling water, but not conveniently with cold water.

The traditional commercial flakes are particularly intended for housewives who may reconstitute them by preparing the exact quantity of hot liquid required and incorporating the flakes therein while stirring gently, for example with a wooden spatula. The granules are particularly intended for catering, their reconstitution permitting the use of boiling water and vigorous stirring, for example with a beater or mixer.

In one known process, potato granules are agglomerated in a rotary drum using a liquid containing up to 10% by weight of milk solids to form 0.3-1.7 mm diameter agglomerates having an apparent density of 0.56 g/cm$^3$ and each formed by approximately 3 to 20 granules. The object of thickness process is to provide a product which can be reconstituted in hot or boiling water while stirring by hand.

In another known process, agglomerates of potato granules smaller than about 0.6 mm in diameter and having an apparent density of 0.4-0.5 g/cm$^3$ are aggregated using a liquid containing 2.5-10% by weight milk solids to form aggregates larger than about 2.4 mm in diameter and having an apparent density of approximately 0.25-0.33 g/cm$^3$ The object of this known process is also to provide a product which may be reconstituted in hot or boiling water while stirring by hand, but which additionally has an apparent density comparable with that of potato flakes, such a density apparently being impossible to obtain by a simple agglomeration process without resulting in excessive fragility of the agglomerates.

In another known process, a moist mixture of 75% potato flakes and 25% potato granules is prepared, mixed, left standing, remixed and dried to form porous spheres having a diameter of approximately 0.2-0.8 mm and an apparent density of approximately 0.56-0.64 g/cm$^3$. The object of this other known process is to provide a product based on potato flakes which retains the advantages of flakes without any of their disadvantages and which, in particular, may be reconstituted both with cold water and with boiling water while stirring, for example with a mixer.

Finally, there is another known process for the production of flakes reconstitutable in water, in which watersoluble proteins and, optionally, emulsifiers are added to a potato puree before it is dried on a cylinder.

SUMMARY OF THE INVENTION

The object of the present invention is to provide a simple process for the agglomeration of potato granules which gives agglomerates having both a high resistance to disintegration in the dry state and good rehydratability for an apparent density which may be as low as that of traditional flakes.

To this end, the process according to the invention is characterized in that 45-55 parts by weight potato granules, 45-55 parts by weight water and 2-3 parts by weight egg white solids are mixed to form a moist granular powder, the moist granular powder is passed through a 3-6 mm mesh sieve, dried to a residual moisture content of 1-10% to form a dry agglomerated powder and the agglomerated powder obtained is crushed to produce agglomerates.

It has surprisingly been found that agglomerates of granules thus bound together with egg white have exceptional properties during and after reconstitution which clearly distinguish them both from traditional potato flakes and from traditional potato granules. This is because these agglomerates may be reconstituted by stirring with a relatively small quantity of boiling water to form a puree similar to that which housewives obtain by passing cooked potatoes through a sieve. This reconstituted raw puree is not delicate, unlike a puree reconstituted from flakes, and may subsequently be further processed by addition of milk and butter until the light texture and desired fluidity are obtained, in the same way as the housewife does from a raw puree of cooked potatoes. There is no danger of the texture becoming sticky as a result of the additional mixing during this texture-adjusting or finishing phase.

The agglomerates obtained by the process according to the invention may have an apparent density as low as that of traditional flakes or higher, but lower than that of traditional granules, depending on the dimensions to which they are reduced during the crushing step. It has suprisingly been found that the texture of the puree obtained by reconstitution of these agglomerates is remarkable and has all the lightness, pulpiness and untuousness of a puree prepared by the housewife from whole potatoes.

DETAILED DESCRIPTION OF THE INVENTION

The starting materials used to carry out the process are potato granules, egg white and water to which it is possible, for example, to add seasonings, such as onion powder, pepper and nutmeg, for example.

The granules may be obtained by a traditional process in which potatoes are cooked, cut up, disintegrated and partially dried by mixing with recycled dried granules, then dried to a residual moisture content of around 3-10%.

Accordingly, both the granules and the water are used in a quantity of 45-55 parts by weight in the mixture. In other words, the granules and the water are mixed in substantially equal quantities. If the quantity of water is increased excessively in relation to the quantity of granules, the energy expended for drying is unnecessarily increased without significantly improving the properties of the agglomerates. If the quantity of granules is excessively increased in relation to the quantity of water, the effect of agglomeration is no longer obtained.

The egg white may be used in fresh or dehydrated form. It is used in a quantity of 2-3 parts by weight dry matter in the mixture, which is necessary and sufficient for obtaining the desired cohesion of the dehydrated agglomerates and the remarkable texture of the reconstituted agglomerates. It has been found that the egg white performs a vital function in the present invention and that it is not possible to replace it by milk or whey proteins, for example, without the agglomerates losing their exceptional properties on reconstitution or even disintegrating during drying. It has been found that it is no longer possible to obtain satisfactory results using a mixture of equal parts of egg white powder and whey powder instead of egg white itself. Finally, it has been found that any addition of fats to the mixture also results in disintegration of the agglomerates during drying and in a loss of the exceptional properties of the agglomerates on reconstitution.

To form the moist granular mixture mentioned above, it is possible, for example, to premix the dry ingredients, namely granules, seasonings and powdered egg white, where the egg white is in that form, and then to spray water onto the dry premix while stirring.

The granular powder is then passed through a 3-6 mm mesh sieve. It is advisable to carry out this sieving step with minimal stressing of the moist powder. This may be done, for example, by means of a rotary brush rotating on the sieve.

So far as the sieve itself is concerned, if a mesh width beyond the range indicated, for example 8 mm, is used, agglomerates are certainly obtained, but the above-mentioned exceptional properties on reconstitution are lost. If a mesh width below the range indicated, for example 2 mm, is used, it is the structure of the agglomerates which is lost because the granular moist powder is overly compressed during its passage through such small meshes.

The granular moist powder may be dried by any method which does not affect its structure or its organoleptic qualities, more especially with moderately hot air. Thus, a 1-5 cm thick and preferably 2-4 cm thick layer of moist powder is preferably formed and air at 50°-90° C. passed through at a speed of approximately 1-10 m/s. For this method of drying, it is advisable to use air at a speed of at least 1 m/s in order not unnecessarily to prolong the drying time, which could alter the taste of the powder. The powder may also be predried in a fluidized bed, for example, to a moisture content of 20-30%. Finally, another particularly suitable embodiment comprises drying the granular powder in vacuo in an oven.

The dry agglomerated powder may be crushed by any method suitable for obtaining granulates having the desired dimensions and hence the desired apparent density. For example, a crushing effect may be obtained by a simple transport system, such as a system of tubes comprising a fall for example. The agglomerates thus obtained may have dimensions of from about 5 to 10 mm and an apparent density of 0.2-0.3 g/cm$^3$ for example. The agglomerated powder may also be gently broken up and/or passed through a sieve. By passing the agglomerated powder through a 7.5 mm mesh sieve, for example, it is possible to obtain agglomerates which have an apparent density of from 0.25 to 0.3 g/cm$^3$. A sieve of significantly smaller mesh may be used to increase the apparent density without losing the above-mentioned exceptional properties on reconstitution of the agglomerates. With a 1 mm mesh sieve for example, it is possible to obtain agglomerates having an apparent density of from 0.40 to 0.45 g/cm$^3$.

EXAMPLES

The invention is illustrated by the following Examples in which parts and percentages are by weight.

EXAMPLE 1

The following ingredients are dry-mixed for 30 s in a 20 liter horizontal mixer:

3 kg of potato granules having an apparent density of approximately 0.9 g/cm$^3$ and a residual moisture content of 6.5-8.5%, obtained by a process in which Bintje potatoes are peeled, sliced, blanched, cooled and cooked, the slices are mixed with recycled granules and are completely disintegrated into separate cells and the non-recycled granules are dried in air at 45°-50° C.;

150 g powdered egg white; and 17.5 g seasonings.

In the same mixer, 3 liters water are sprayed onto the dry mixture in 4 minutes. Six batches of 6.2 kg moist granular powder per hour are thus prepared and are fed to a line comprising a first granulator, a perforated belt hot-air dryer and a second granulator.

In the first granulator, the moist granular powder is passed through a 3.15 mm mesh sieve. A 1.5 cm thick layer of this moist powder is then formed on the belt of the dryer which has a width of 40 cm and perforations 1.5 mm in diameter. The belt passes successively into two chambers in which air passes through it at a speed of 4 m/s and at an entry temperature of 70° C. for a total of 8 minutes. The belt of the dryer thus delivers 19 kg/h dry agglomerated powder.

In the second granulator, the dry agglomerated powder is passed through a 7.5 mm mesh sieve. Agglomerates are obtained which have an apparent density of approximately 0.25 g/cm$^3$ and a residual moisture content of 1%, the majority of agglomerates being between 1 and 5 mm in size.

These agglomerates lend themselves to reconstitution in the following manner:

500 ml water to which 4 g salt has been added are brought to the boil in a saucepan and the heat turned off. 125 g agglomerates are poured into the boiling water with gentle stirring. After a few moments, 20 g butter and 150-200 ml milk are added and the whole is mixed.

When the agglomerates have absorbed the boiling water, the raw puree obtained has the appearance and consistency of the puree which the housewife obtains by passing cooked potatoes through a sieve; it also has the same composition, both containing approximately 20% dry matter. The finishing of the puree by subsequent addition of butter and milk also corresponds to the finishing of a domestic puree.

The ready-to-eat puree thus obtained by reconstitution of these agglomerates has all the lightness, pulpiness and unctuousness of a domestic puree. If it is not served immediately, it may be reheated in the saucepan while adding a little milk and stirring with a fork without its good consistency being destroyed.

EXAMPLE 2

The procedure is the same as described in Example 1, except that, in the second granulator, the moist powder is passed through a 1 mm mesh sieve. Agglomerates are obtained which have an apparent density of 0.42 g/cm$^3$, but of which the properties on reconstitution are similar to those of the agglomerates of Example 1.

EXAMPLE 3

300 kg of a dry mixture of potato granules, egg white powder and seasonings in the proportions described in Example 1 are prepared by mixing for 2 minutes in a horizontal mixer.

In the mixer, water is then sprayed onto the dry mixture while stirring until the weight of the batch is doubled. 600 kg moist granular powder are obtained in 3 minutes and are passed through a 6 mm mesh sieve at a rate of 4.5 kg/min.

The moist powder is predried for 5-10 mins. in a fluidized bed dryer using air at 80° C. until it has a residual moisture content of approximately 25%. A 3 cm thick layer of the predried powder is formed on the perforated belt of a hot air dryer. The belt passes through 3 successive drying chambers, in which air passes through it at 3 m/s and at respective entry temperatures of 60, 70 and 80° C., in 1.5-2 hours. The belt delivers approximately 120 kg/h dry agglomerated powder which is transported to a filling station by a transport system of tubes comprising a fall. The agglomerated powder is crushed during this transport and arrives at the filling station in the form of agglomerates having a uniform golden-yellow colour with average sizes of from 3 to 5 mm.

These agglomerates have an apparent density of 0.28 g/cm$^3$, a residual moisture content of approximately 1-2% and properties on reconstitution similar to those of the agglomerates of Example 1.

EXAMPLE 4

The procedure is as described in Example 1, except that the moist granular powder, in the form of a 4 cm thick layer, is oven-dried for 3 h at 80° C. under a pressure of 0.1 bar.

Agglomerates having a residual moisture content of 4% are obtained which are otherwise similar in every respect to the agglomerates of Example 1.

I claim:

1. A process for the agglomeration of potato granules comprising mixing 45 to 55 parts by weight of potato granules, 45 to 55 parts by weight of water and 2 to 3 parts dry matter by weight of egg white solids, passing the mixture through a 3 mm to 6 mm mesh sieve, drying the sieved mixture to a residual moisture content of from 1% to 10% and then crushing the dried mixture and obtaining agglomerates.

2. A process according to claim 1 wherein the egg white solids are in a powder form and are premixed with the potato granules prior to mixing with water.

3. A process according to claim 2 wherein water is sprayed on the premixed egg white solids and potato granules while stirring the mixture for obtaining the mixture to be sieved.

4. A process according to claim 1 or 2 wherein the dried mixture is crushed for obtaining agglomerates having an apparent density of from 0.2 g/cm$^3$ to 0.45 g/cm$^3$.

5. A process according to claim 1 wherein the sieved mixture is dried in a 1 cm to 5 cm thick layer by passing air at 50° C. to 90° C. through the layer at a speed of from about 1 m/sec to about 10 m/sec.

6. A process according to claim 1 further comprising predrying the sieved mixture in a fluidized bed drier to a moisture content of from 20% to 30% and then drying the predried mixture to the residual moisture content of from 1% to 10%.

7. A process according to claim 6 wherein the sieved mixture is dried in vacuo in an oven.

* * * * *

UNITED STATES PATENT AND TRADEMARK OFFICE
CERTIFICATE OF CORRECTION

PATENT NO. : 4,797,292

DATED : January 10, 1989

INVENTOR(S) : Johannes DE WIT

It is certified that error appears in the above-identified patent and that said Letters Patent is hereby corrected as shown below:

Column 1, line 36, "thickness" should be --this known--.

Column 1, line 67, "watersoluble" should be --water-soluble--.

Column 4, line 68, "$cm^3$'" should be --$cm^3$,--.

Column 6, line 35, [Claim 7, line 1], "6" should be --1--.

Signed and Sealed this

Eleventh Day of April, 1989

Attest:

DONALD J. QUIGG

Attesting Officer

Commissioner of Patents and Trademarks